(12) United States Patent
Watanabe et al.

(10) Patent No.: US 7,806,005 B2
(45) Date of Patent: Oct. 5, 2010

(54) MAGNETOSTRICTIVE TORQUE SENSOR AND ELECTRIC POWER STEERING APPARATUS INCLUDING THE SAME

(75) Inventors: Katsuji Watanabe, Utsunomiya (JP); Yasuo Shimizu, Shimotsuke (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/730,960

(22) Filed: Apr. 5, 2007

(65) Prior Publication Data
US 2007/0251333 A1 Nov. 1, 2007

(30) Foreign Application Priority Data
Apr. 14, 2006 (JP) .............................. 2006-111691

(51) Int. Cl.
*G01L 3/00* (2006.01)
(52) U.S. Cl. ................................. 73/862.333
(58) Field of Classification Search ................................
73/862.331–862.338
See application file for complete search history.

(56) References Cited

U.S. PATENT DOCUMENTS

| | | | | |
|---|---|---|---|---|
| 4,866,682 A | * | 9/1989 | Uchihashi et al. | ........... 367/153 |
| 5,142,919 A | * | 9/1992 | Satoh et al. | ............ 73/862.333 |
| 5,193,267 A | * | 3/1993 | Satoh et al. | .................... 29/606 |
| 6,439,066 B1 | * | 8/2002 | Norton | ................... 73/862.333 |
| 6,868,936 B2 | * | 3/2005 | Shimizu et al. | ............. 180/444 |
| 6,959,781 B2 | * | 11/2005 | Shimizu et al. | ............. 180/444 |
| 7,013,741 B2 | * | 3/2006 | Nakamura et al. | ...... 73/862.333 |
| 7,357,216 B2 | * | 4/2008 | Ishii et al. | .................... 180/444 |
| 2001/0029791 A1 | * | 10/2001 | Sezaki | ................... 73/862.333 |

FOREIGN PATENT DOCUMENTS

| | | |
|---|---|---|
| JP | 59-164932 A | 9/1984 |
| JP | 2002-316658 A | 10/2002 |

* cited by examiner

*Primary Examiner*—Lisa M Caputo
*Assistant Examiner*—Octavia Davis
(74) *Attorney, Agent, or Firm*—Arent Fox LLP

(57) ABSTRACT

This magnetostrictive torque sensor includes: a shaft made of a magnetized material; a magnetostrictive portion provided on the shaft at a position distanced for a predetermined length from an end of the shaft; a detection coil that is arranged so as to face the magnetostrictive portion, and detects a change in a magnetic characteristic of the magnetostrictive portion; and a plating made of an nonmagnetic material, that is provided on the end of the shaft.

8 Claims, 5 Drawing Sheets

MAGNETOSTRICTIVE TORQUE SENSOR AND ELECTRIC POWER STEERING APPARATUS INCLUDING THE SAME

BACKGROUND OF THE INVENTION

Priority is claimed on Japanese Patent Application No. 2006-111691, filed Apr. 14, 2006, the contents of which are incorporated herein by reference.

FIELD OF THE INVENTION

The present invention relates to a magnetostrictive torque sensor and an electric power steering apparatus including the same.

DESCRIPTION OF THE RELATED ART

A magnetostrictive torque sensor that detects a torque based on a change in magnetic characteristic occurred by magnetostriction is used for purposes such as detecting steering torque in a steering apparatus of a vehicle (refer to Japanese Unexamined Patent Application, First Publication No. 2002-316658).

The magnetostrictive torque sensor is constructed by providing magnetostrictive films on a shaft made of magnetic material, and by arranging detection coils so as to face the magnetostrictive films to detect the changes in magnetic characteristic of the magnetostrictive films (refer to Japanese Unexamined Patent Application, First Publication No. S59-164932). The principle of the magnetostrictive torque sensor can be explained as follows. That is, when a torque is applied to the shaft, the magnetic permeability of the magnetostrictive films will change, and inductances of the detection coils will also change in response to the change, and thereby the torque is detected based on the changes.

Manufacturing processes of a magnetostrictive torque sensor include a plurality of processes such as: providing the magnetostrictive films on the shaft; machining a pinion being a reduction mechanism; and attaching other gears. During these processes, the shafts need to be transferred. Therefore, conventionally, the shafts are transferred by grouping the plurality of shafts and accommodating them into a special transferring pallet for transferring them. This transferring pallet is formed by nonmagnetic material such as stainless steal, and is constructed so as to stand the shafts, accommodate portions having magnetostrictive films thereof, support the shafts while exposing distal ends thereof in order to be removed and inserted easily by gripping the distal ends.

However, since the distal ends are exposed while transferring the shafts, if magnetized objects such as tools having magnets touch the distal ends of the shafts, then the shaft have a possibility of being magnetized and thereby deteriorating the characteristic of the magnetostrictive films.

In addition, after assembling the magnetostrictive torque sensor, since an end of the shaft protrudes from a housing, the shaft still has a possibility in that the end thereof touches the magnetized objects and thereby being magnetized, even though the shaft is a finished product.

In addition, when the magnetostrictive torque sensor is attached to a vehicle, during the attaching process and after the attaching process, the shaft has a possibility in that the end thereof touches the magnetized objects since the end is exposed.

As explained in the above, when employing the magnetostrictive torque sensor, careful attention needs to be taken in order to prevent magnetizing the shaft. In especially, since the careful attention was required during transferring the shafts (especially, strict care was required during transferring the shafts), this affected the productivity thereof.

Accordingly, the present invention was made in view of the above circumstances, and has an object of providing: a magnetostrictive torque sensor that enables easy care of a shaft and thereby improving the productivity thereof; and an electric power steering apparatus including the same.

SUMMARY OF THE INVENTION

The present invention employed the followings in order to achieve the above-mentioned object.

That is, a magnetostrictive torque sensor includes: a shaft made of a magnetized material; a magnetostrictive portion provided on the shaft at a position distanced for a predetermined length from an end of the shaft; a detection coil that is arranged so as to face the magnetostrictive portion, and detects a change in a magnetic characteristic of the magnetostrictive portion; and a plating made of an nonmagnetic material, that is provided on the end of the shaft.

According to the magnetostrictive torque sensor, the shaft will not be magnetized even when a magnetized object touches the end of the shaft, and thereby enabling easy care of the shaft and improving the productivity thereof. In addition, even after the magnetostrictive torque sensor is constructed as a finished product, the shaft thereof will be hardly magnetized and thereby enabling easy care of the magnetostrictive torque sensor. Furthermore, since the magnetostrictive portion will not be affected by a magnet, the detection accuracy of the magnetostrictive torque sensor can be increased.

In addition the present invention employed an electric power steering apparatus which detects a steering input by a driver, and drives a motor in response to the detected steering input to steer a vehicle, the electric power steering apparatus including: the above-mentioned magnetostrictive torque sensor that detects the steering input; and a reduction mechanism that is unitarily provided on another end of the shaft in order to transfer a torque generated by the driver or by the motor.

According to the magnetostrictive torque sensor, it is possible to obtain an easy care for the shaft during manufacturing processes of the magnetostrictive torque sensor, and thereby improving the productivity. In addition, it is also possible to obtain an easy care for the magnetostrictive torque sensor for an electric power steering apparatus as a finished product. Furthermore, since the magnetostrictive portion will not be affected by a magnet, the detection accuracy of the magnetostrictive torque sensor can be increased.

DETAILED DESCRIPTION OF THE INVENTION

One embodiment of a magnetostrictive torque sensor and an electric power steering apparatus including the same, according to one embodiment of the present invention will be explained below with reference to FIGS. 1 to 5. Moreover, the magnetostrictive torque sensor of the present embodiment will be explained for a case in which it is used as a torque sensor assembled in the electric power steering apparatus that detects a steering input by a driver, and steers a vehicle by driving a motor in response to the detected steering input.

Figure 1:
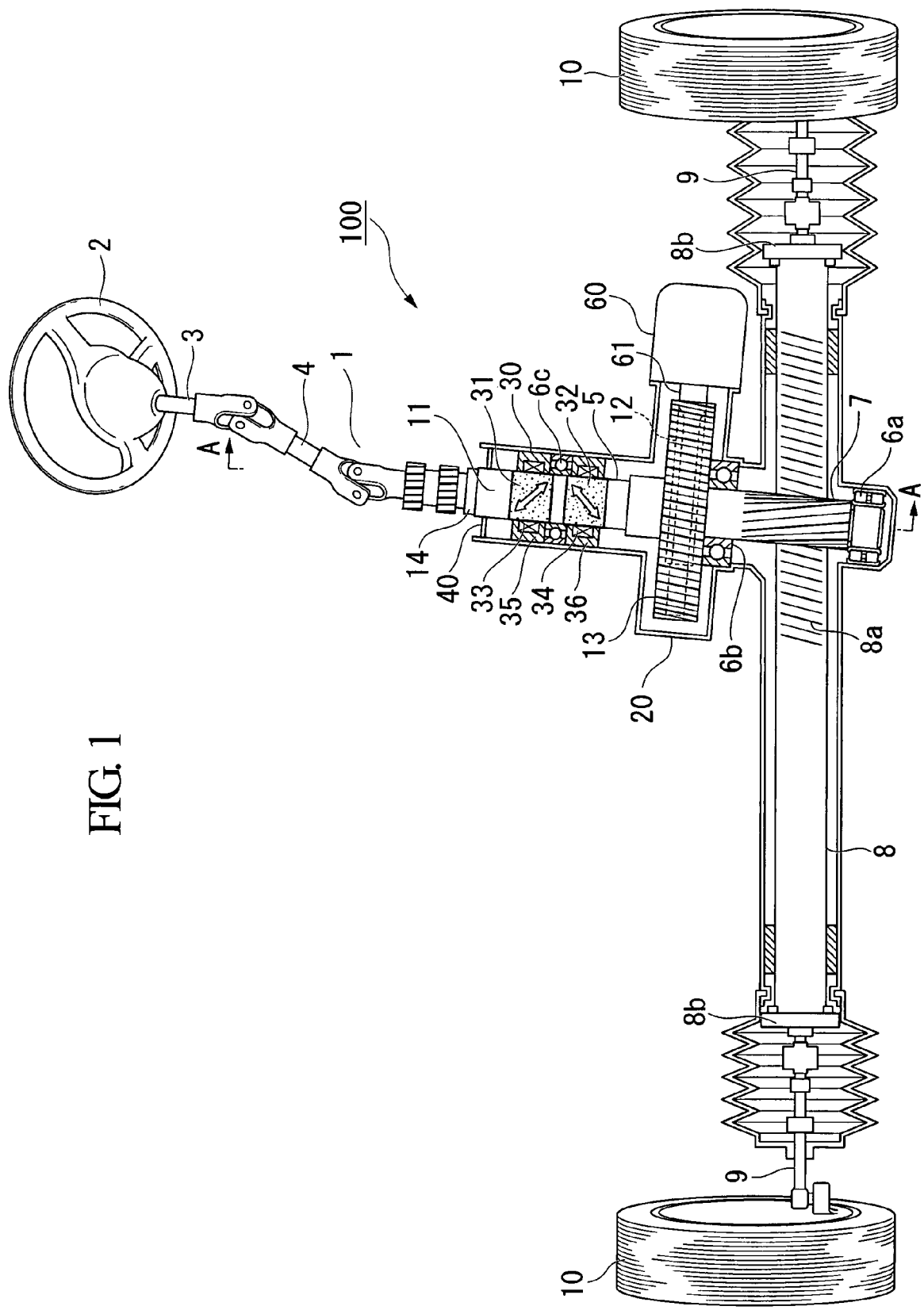
FIG. 1 shows a schematic construction view of an electric power steering apparatus provided with a magnetostrictive torque sensor according to one embodiment of the present invention.
Figure 2:
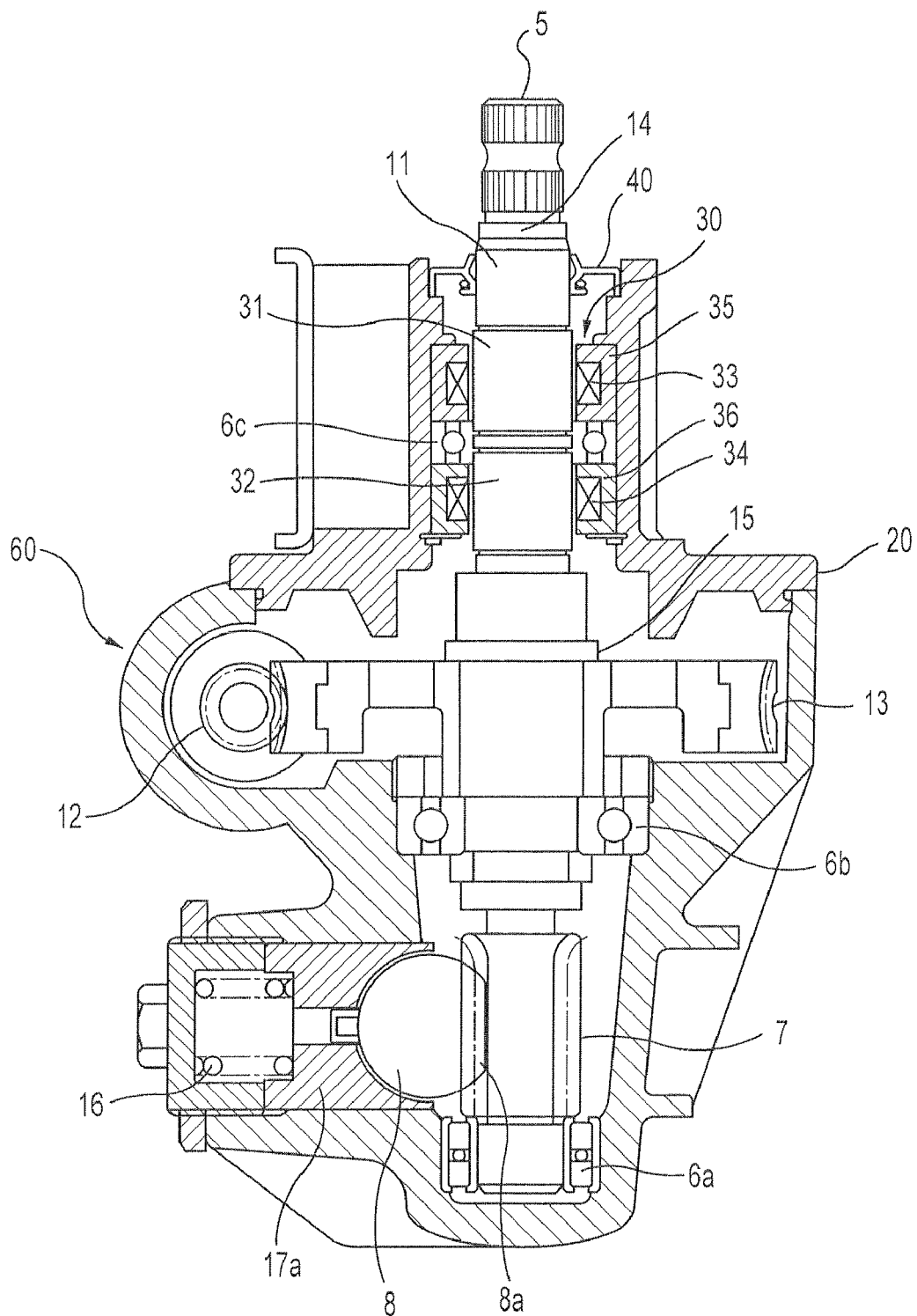
FIG. 2 shows a detailed cross-sectional view of the electric power steering apparatus, taking along a line A-A in FIG. 1.

FIG. 1 shows a schematic construction of an electric power steering apparatus 100, and FIG. 2 shows a detailed cross-sectional view of the electric power steering apparatus 100, taking along a line A-A in FIG. 1.

The electric power steering apparatus 100 is provided with a steering shaft 1 that is joined with a steering wheel (steering member) 2. The steering shaft 1 is constructed by joining a main steering shaft 3 that is unitarily joined with the steering wheel 2, with a pinion shaft 5 to which a pinion 7 of a rack-and-pinion mechanism is unitarily provided, through a universal joint 4.

The pinion shaft 5 is made of magnetized material, and a lower portion thereof is supported by a bearing 6a, a middle portion thereof is supported by a bearing 6b, and an upper portion thereof is supported by a bearing 6c. The pinion 7 is unitarily formed at a lower end portion of the pinion shaft 5. The pinion 7 meshes with a rack 8a of a rack shaft 8 that can reciprocate in the vehicle width direction. The rack shaft 8 is pressed toward the pinion 7 by a rack guide 17 urged by a spring 16. Each of rack ends 8b provided on two ends of the rack shaft 8 is joined with a tie rod 9. Each of the tie rods 9 is linked to a front wheel 10 being a steering wheel. With this construction, a steering operation with a normal rack-and-pinion system can be made while steering the steering wheel 2, and thereby enabling steering of the front wheels 10 to change the direction of the vehicle. Moreover, the rack shaft 8 and the tie rods 9 form a steering system.

The electric power steering apparatus 100 is further provided with a steering motor (hereinafter "motor") 60 including a brushless motor that generates assisting torque for reducing steering force by the steering wheel 2. The motor 60 is fixed to a housing of a steering gear box (hereinafter "gear box housing") 20. A worm gear 12 is formed on an output shaft 61 inserted into the gear box housing 20. The worm gear 12 meshes with a worm wheel gear 13 that is unitarily provided to the pinion shaft 5. The worm gear 12 and the worm wheel gear 13 form a reduction mechanism. Torque generated by the motor 60 is increased by the worm gear 12 and the worm wheel gear 13, and is then transmitted to the pinion shaft 5.

Magnetostrictive films (magnetostrictive portion) 31 and 32 are provided to an exterior of the pinion shaft 5 at an upper position and a lower position than the bearing 6c provided on the upper position of the pinion shaft 5, so as to sandwich the bearing 6c therebetween. Detection coils 33 and 34 are arranged so as to face the magnetostrictive films 31 and 32.

The magnetostrictive films 31 and 32 are provided on the pinion shaft 5 at a position distanced for a predetermined distance from an axial end thereof. The detection coils 33 and 34 are each attached to the gear box housing 20 via coil cases 35 and 36, and are connected to a detection circuit (not illustrated). This detection circuit converts the changes in inductances of the each detection coils 33 and 34 that are generated in accordance with magnetostriction, to the changes in voltage, and then the detection circuit inputs them into a controller (not illustrated). The controller calculates steering torque applied to the steering shaft 1 based on the outputs from the detection circuit. In this electric power steering apparatus 100, the pinion shaft 5, the magnetostrictive films 31 and 32, and the detection coils 33 and 34 form a magnetostrictive torque sensor 30 that detects the steering torque (input steering power).

A sealing portion 11 is formed on an upper side of the pinion shaft 5 than the magnetostrictive film 31. An oil sealing 40 is attached at a position between the sealing portion 11 and the gear box housing 20. A portion of the pinion shaft 5 lower than the sealing portion 11 is housed in the gear box housing 20, while a portion of the pinion shaft 5 higher than the sealing portion 11 is exposed from the gear box housing 20.

Figure 3:
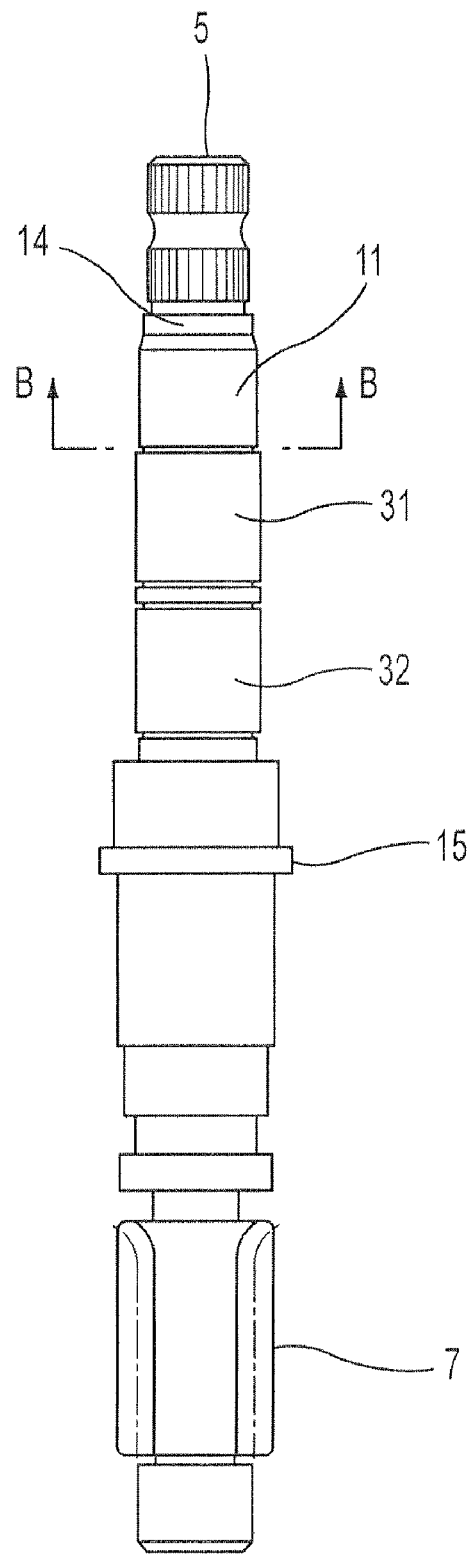
FIG. 3 shows a front view of a pinion shaft of the present embodiment.

As shown in FIG. 3, a plating layer 14 made of nonmagnetic material is formed on an exterior of an end of the pinion shaft 5, on the upper side (i.e., an upper side than an arrow B in FIG. 3) than the magnetostrictive film 31. That is, as shown in FIGS. 1-3 and 5, the plating layer 14 of nonmagnetic material is located between the portion of the shaft having the magnetostrictive films 31 and 32 and the end of the pinion shaft 5.

In this electric power steering apparatus 100, the magnetostrictive torque sensor 30 detects a steering torque (input steering power) by a driver, and the motor 60 is driven in response to the detected steering torque to steer the front wheels 10.

By the way, the manufacturing of the electric power steering apparatus 100 includes a plurality of processes such as forming the magnetostrictive films 31 and 32 onto the pinion shaft 5, forming the pinion 7 on the lower end of the pinion shaft 5, and attaching the worm wheel gear 13 to the pinion shaft 5; therefore, the pinion shaft 5 needs to be transferred during the processes.

Figure 4:
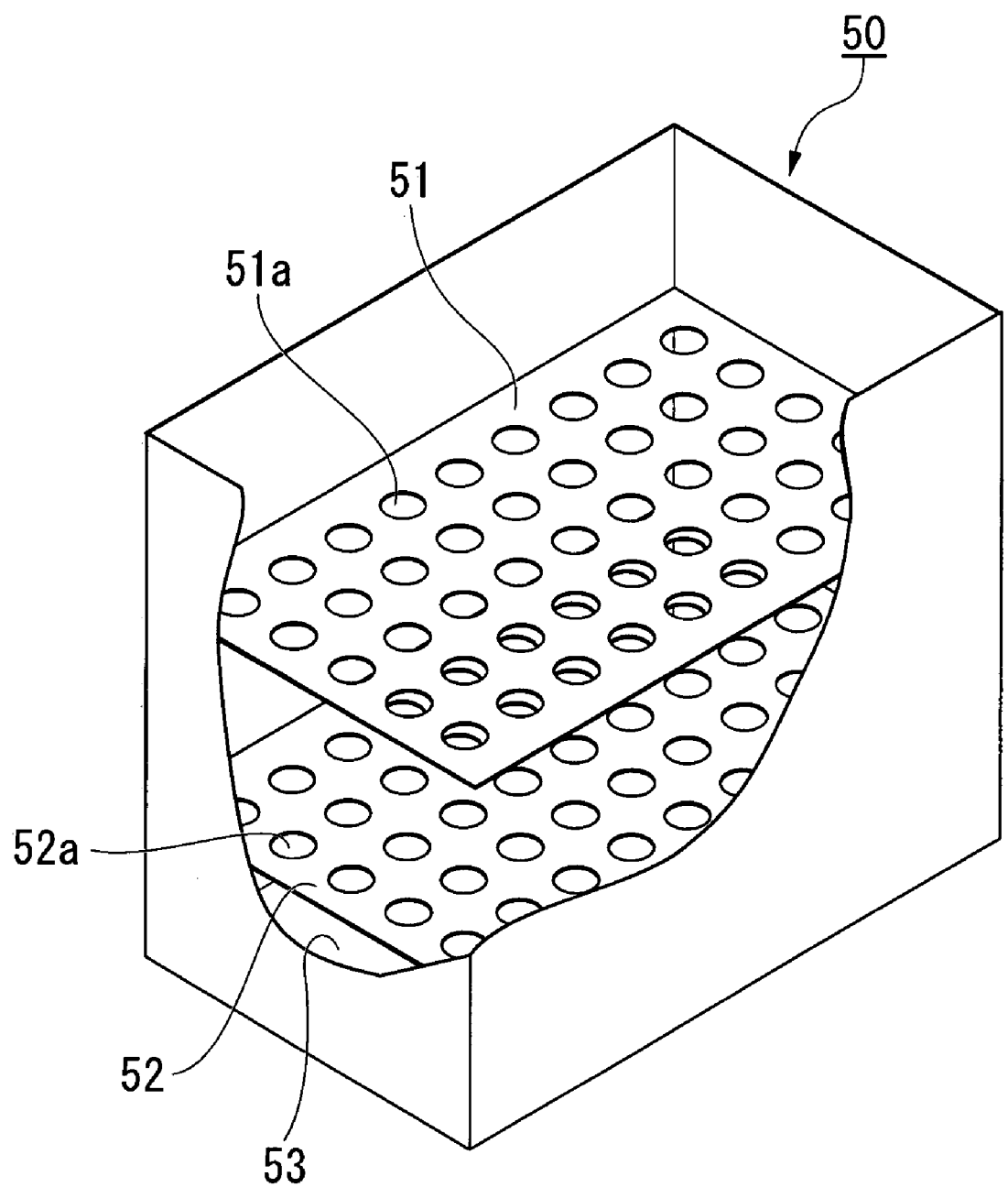
FIG. 4 shows a perspective view of one example of a pinion shaft transferring pallet

A plurality of the pinion shafts 5 are grouped in one unit and are accommodated in a transferring pallet (hereinafter "pallet") 50 shown in FIG. 4 to transfer the pinion shafts 5.

The pallet 50 is formed in a rectangular box having a top opening, which is made of nonmagnetic steel plates (for example, stainless steel plates). The pallet 50 is provided with a pair of supporting plates 51 and 52 therein so as to be arranged at middle sections thereof in the vertical direction. The lower supporting plate 52 is formed with a number of holes 52a for engaging maximum diameter portions 15 of the pinion shafts 5. The upper supporting plate 51 are formed with a number of holes 51a through which the maximum diameter portions 15 pass, so as to be concentric with the holes 51b.

Figure 5:
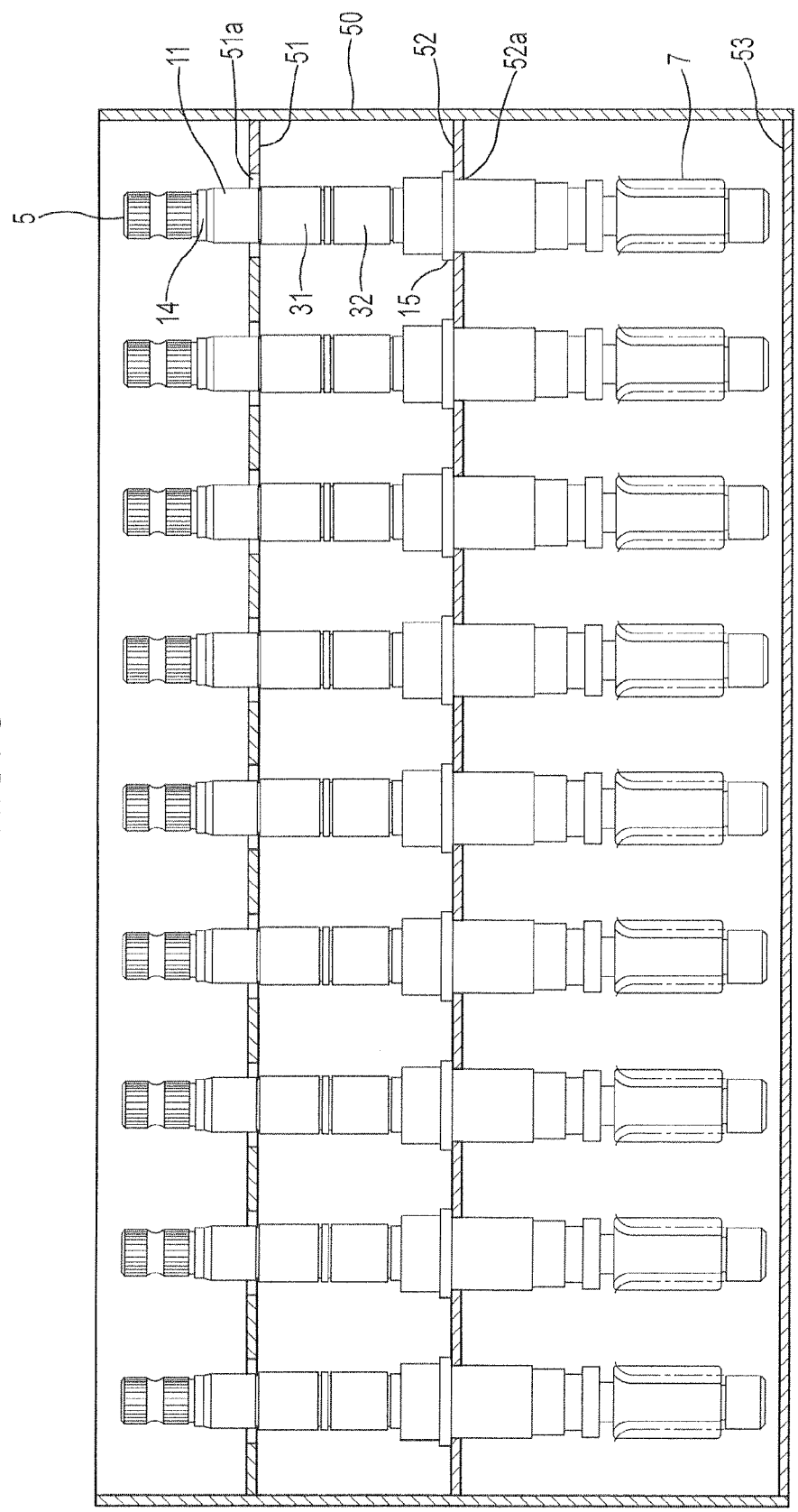
FIG. 5 shows a cross-sectional view of the pinion shaft transferring pallet accommodating a plurality of the pinion shafts.

As shown in FIG. 5, by inserting the pinion shafts 5 into the holes 51a and 52a of the pallet 50, the pinion shafts 5 are accommodated and supported so as to stand in the vertical direction. Like this, when the pinion shafts 5 are housed in the pallet 50, the maximum diameter portions 15 of the pinion shafts 5 engages with the holes 52a of the lower supporting plate 52, the lower ends of the pinion shafts 5 are arranged at a position distanced from a bottom end plate 53 of the pallet 50, and the sealing portions 11 of the pinion shafts 5 are inserted into the holes 51a of the upper supporting plate 51. That is, in the pinion shafts 5, only the plating layers 14 are exposed to the outside of the pallet 50 from the upper supporting plate 51. The pinion shafts 5 can be inserted into or removed from the pallet 50 by gripping the plating layers 14.

Accordingly, while accommodating the pinion shafts 5 in the pallet 50 and transferring them, the pinion shafts 5 will not be magnetized even when a magnetized object such as a tool having a magnet or the like touches the plating layer 14 that is an exposed portion of the pinion shaft 5 from the pallet 50. As a result, care for the pinion shafts 5 become easy and thereby the productivity thereof will be increased. In addition, since the magnetostrictive films 31 and 32 will not be affected by magnets, the detection accuracy of the magnetostrictive torque sensor 30 can be increased.

In addition, even after the magnetostrictive torque sensor 30 is completed by assembling the pinion shaft 5 into the gear box housing 20, as shown in FIG. 2, a portion of the pinion shaft 5 that is exposed from the gear box housing 20 is only the plating layer 14; therefore, the pinion shaft 5 will not be magnetized even when a tool having magnets touches the plating layer 14. As a result, care for the magnetostrictive torque sensor 30 becomes easy, and thereby the handling thereof becomes easy. Furthermore, since the magnetostrictive films 31 and 32 will not be affected, the detection accuracy of the magnetostrictive torque sensor 30 can be increased.

Moreover, when the plating layer 14 made of nonmagnetic material is formed by electroless nickel plating, since dimension accuracy can be increased, a finishing treatment needs not to be performed after plating the plating layer 14 onto the sealing portion 15 to which the oil sealing 40 touches; therefore, the productivity can be further improved. Furthermore, since the electroless nickel plating also has rustproofing effect, in a vehicle having a layout in which the steering shaft 1 is disposed at the cabin exterior, rustproofing process is unnecessary, and thereby the productivity thereof can be increased.

Another Embodiment

Moreover, the present invention will not be limited only in the above-mentioned embodiment.

For example, in the above-mentioned embodiment, the plating layer 14 made of nonmagnetic material is provided on the end of the pinion shaft 5, where the magnetostrictive films 31 and 32 are provided (i.e., the upper end side of the pinion shaft 5 shown in FIG. 3); however, the plating layer 14 made of nonmagnetic material may be provided on the end where the pinion 7 is provided. Furthermore, the plating layer 14 made of nonmagnetic material may be provided on the two ends.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATIONS FOR REFERENCE SYMBOLS

5 . . . pinion shaft (shaft);
7 . . . pinion (reduction mechanism);
10 . . . front wheel (wheel);
14 . . . plating layer (plating);
30 . . . magnetostrictive torque sensor;
31 and 32 . . . magnetostrictive film (magnetostrictive portion);
33 and 34 . . . detection coil;
60 . . . motor;
100 . . . electric power steering apparatus.

What is claimed is:

1. A magnetostrictive torque sensor comprising:
a shaft made of a magnetized material;
a magnetostrictive portion provided on the shaft at a position distanced for a predetermined length from an end of the shaft;
a detection coil that faces the magnetostrictive portion, and detects a change in a magnetic characteristic of the magnetostrictive portion; and
a plating made of a nonmagnetic material, that is located above the magnetostrictive portion and between the magnetostrictive portion and the end of the shaft in an axial direction of the shaft.

2. An electric power steering apparatus which detects a steering input by a driver, and drives a motor in response to the detected steering input to steer a vehicle, the electric power steering apparatus comprising:
the magnetostrictive torque sensor according to claim 1, that detects the steering input; and
a reduction mechanism that is unitarily provided on another end of the shaft in order to transfer a torque generated by the driver or by the motor.

3. The electric power steering apparatus according to claim 2, further comprising:
a rack shaft, which comprises a rack,
wherein the shaft is a pinion shaft having a pinion, and
wherein the rack of the rack shaft and the pinion of the pinion shaft meshingly engage each other.

4. The electric power steering apparatus according to claim 2, wherein the plating is provided directly on an outer surface of the shaft.

5. The electric power steering apparatus according to claim 3, wherein the plating is provided directly on an outer surface of the shaft.

6. The magnetostrictive torque sensor according to claim 1, wherein the plating is provided directly on an outer surface of the shaft.

7. The magnetostrictive torque sensor according to claim 1, further comprising a plating made of a nonmagnetic material, that is located at the end of the shaft.

8. The magnetostrictive torque sensor according to claim 1, wherein the plating is provided between the magnetostrictive portion and the end shaft in the axial direction of the shaft so as to cover an exterior of the shaft.

* * * * *